Patented Aug. 7, 1951

2,562,882

UNITED STATES PATENT OFFICE 2,562,882

CHLORINATION OF CELLULOSE

Harold N. Barham, Manhattan, Kans., assignor to Sharples Chemicals Inc., a corporation of Delaware No Drawing. Application August 26, 1948,
Serial No. 46,367

19 Claims. (Cl. 260—212)

This invention pertains generally to the chlorination of cellulose. It pertains more particularly to a process for the chlorination of cellulose, and to new chlorinated cellulose products, that is, chlorinated cellulose products in which the chlorine is chemically bound to the cellulose.

Many processes have been described in the prior art, in which cellulose and cellulosic materials are treated with chlorine, but these processes, insofar as I am aware, concern themselves either with the bleaching of cellulosic material without the chemical combination of the cellulose with the chlorine employed in the treatment, or with the chlorination or lignin contained in woody materials, and its subsequent removal, such as with alkali, from the cellulose which is left unaffected by the treatment.

My invention, on the other hand, pertains to the chemical combination of chlorine with cellulose in the production of cellulose chloride, or a series of cellulose chlorides of different chemically bound chlorine content.

There is evidence that both oxidation and substitution reactions are involved in the production of a series of products of varying chlorine percentages, a by-product of the reaction being hydrogen chloride.

In the practice of my invention, chlorine in liquid phase is employed as the reagent, and the cellulose treated to produce the desired products is immersed in the liquid chlorine. Thus in the practice of the invention it is preferred that the cellulose be completely covered with liquid chlorine, since any cellulose extending above the liquid will be subjected to a vapor phase treatment resulting in products wholly different in character in that they are largely products of carbonization, or other degradation products.

Any means known in the art may be employed for maintaining the chlorine in liquid phase, such as self-induced pressure in a closed container, for example, an autoclave. Thus as long as the chlorine employed for chlorination purposes is maintained in the liquid phase, the pressure in the zone of reaction may be at any desired level.

In the practice of my invention, cellulose is immersed in liquid chlorine, such as in an autoclave. The actual size of the cellulose sample is, of course, determined by the size and shape of the autoclave as is the amount of liquid chlorine required to immerse, or in other words, completely cover the cellulose, as is preferred for the reasons above set forth.

While it is usually preferred to treat cellulose in a relatively pure and dry state, it is to be understood that impure cellulose, that is, cellulose as it occurs in nature or cellulose in a partially purified state, may likewise be treated in the production of chlorinated cellulose products more or less contaminated with impurities due to the impurities present in the cellulose subjected to treatment. While dry cellulose, for example, cellulose dried under vacuum in an oven, is frequently preferred, moisture-containing cellulose may also be treated, such as, cellulose containing up to 1% or 2% of water by weight, or if dry, such water may be added to the system. In fact, the presence of water may, in certain instances, have a desired effect. For instance, the presence of water in amounts less than approximately 100% by weight of dry cellulose, for example, below 20% or 10% will in many instances speed up the chlorination reaction. Water, such as, up to 10 times the weight of the cellulose will result in increasingly greater production of highly oxidized low molecular weight products, such as, carboxylic acids.

While any suitable temperature may be maintained in the reaction zone, I usually prefer to employ temperatures between 50° C. and 150° C., and more particularly, between 70° C. and 130° C., in order that the reaction may proceed at a reasonable rate by having the temperature sufficiently high, and in order to avoid the production of excessive quantities of by-products by maintaining the temperature below the point at which excessive amounts of by-products are produced, such as by destructive decomposition.

The time of the reaction will obviously vary with the temperature, the reactivity of the cellulose under treatment, and the degree of chlorination desired. As an example, the treatment of raw cellulose for eight days at a temperature of 70° C. in the reaction zone resulted in a chlorinated cellulose product containing 22.79% by weight of chemically bound chlorine.

While the process may be carried out by operating batchwise, it lends itself to other types of treatment, such as, batch counter-current, or a treating procedure wherein liquid chlorine is made to flow through a body of cellulose under treatment with recycling of the liquid chlorine, if desired, such as after the removal of HCl therefrom.

Since chlorine under the temperature of treatment has a substantial vapor pressure, chlorine is present in the vessel in both the liquid and vapor phases unless, of course, the vessel is completely filled with liquid.

Examples of cellulosic materials which may be treated in accordance with my invention are cotton, such as, commercial cotton or cotton linters, woodpulp, cotton rags, paper, etc., with or without pretreatment for purposes of purification, change of physical form, or otherwise. Thus regenerated cellulose, such as made by the viscose process or the cuprammonium process may be subjected to my chlorination treatment.

In the case of impure cellulose, such as naturally occurring cellulose, the impurities may be separated prior to treatment to any desired extent, or the chlorinated cellulose products may be purified to any desired extent after their production in accordance with my invention. In certain instances, valuable by-products may be produced, such as from lignin normally present in many naturally occurring cellulosic materials.

As an example, ligno-cellulose has been chlorinated to yield a product containing 34% by weight of chemically bound chlorine by treatment in accordance with my process for 48 hours at a temperature of 50° C.

My new products have a variety of uses, for example, as chemical intermediates, since the ketonic groups as well as the chlorine atoms serve as reactive centers. Since they have certain toxic characteristics, a possible use is for insecticidal and bacterial sterilization purposes. They may also be employed as constituents of copolymers in the production of plastics.

In the practice of my process, any desired degree of chlorination of the cellulose may be effected. For instance, cellulose may be converted into chlorinated products varying in chlorine content from one chlorine atom per glucoside unit to six chlorine atoms per glucoside unit of the cellulose molecule, it being generally understood that the cellulose molecule is made up of recurring glucoside units arranged linearly.

If the monochloride is the ultimately desired product, a reaction product comprising the monochloride in substantial part may be obtained by the simple expedient of cooling the reaction mixture to room temperature or below when a substantial quantity of monochloride has been formed, and thereafter removing chlorine and hydrogen chloride from the reaction vessel. This stage occurs when approximately 17% to 20% by weight of chlorine based on the chlorinated product has become chemically bound in the cellulose, the monochloride theoretically containing 18.22% of chemically bound chlorine by weight.

It should be noted at this point that it may, in some instances, be desired to form a product which has not yet, at least for the most part, reached the monochloride stage, and if this is the desire of the operator, such product may be obtained by a simple cooling procedure followed by removal of hydrogen chloride and excess chlorine at any stage of the reaction of forming the monochloride. This termination of the chlorination reaction may be made at any desired point after chlorine has become chemically bound to the cellulose, such as, when at least 5%, and more particularly at least 7% by weight of chlorine based on the chlorinated product has become chemically bound to the cellulose. While the latter products are somewhat unstable, they have a fair amount of stability and may be used in organic syntheses, oxidation reactions, and for other purposes.

A major purpose, however, is to produce materials containing in excess of 10% of chemically bound chlorine, and particularly in excess of 17%.

As pointed out above, a product which is largely the monochloride will be obtained when the degree of chlorination is between approximately 17% and 20%, the theoretical chlorine content of the monochloride being 18.22%.

If a product of a more advanced stage of chlorination than the monochloride is desired, it is merely necessary to continue the reaction to effect the desired further chlorination.

Thus a product, which is largely dichloride, will be obtained when the degree of chlorination is between approximately 30% and 33% by weight of the chlorinated product, the theoretical chlorine content of the dichloride being 31.24% chlorine.

Likewise, the chlorinated product will be largely trichloride when the degree of chlorination falls between approximately 40% and 42%, the theoretical chlorine content of the trichloride being 41.00%.

The product will be largely tetrachloride when the degree of chlorination falls between approximately 47% and 50%, the theoretical chlorine content of the tetrachloride being 48.26%, and largely the hexachloride when the degree of chlorination falls between approximately 57% and 60%, the theoretical chlorine content of the hexachloride being 58.46%.

Thus the operator can obtain a product comprising, for the most part, cellulose monochloride, or of the respective higher chlorides, by conducting the chlorination until the desired amount of chlorine has been combined with the cellulose molecule and by terminating the reaction at this point. He may also obtain products of intermediate degrees of chlorination, short of the monochloride, or between the respective chlorides, by similar control of the percentage content of the chlorine of the product.

It will be understood that the chlorine present in my chlorinated cellulose products may not be uniformly distributed throughout the glucoside chain in all instances. Thus, for instance, a product referred to as a monochloride contains an average of about 1 chlorine atom per glucoside unit. The same pertains to the dichloride, etc.

The initial reaction of the liquid chlorine on the glucoside units of the cellulose molecules causes formation of products which may be designated as hypochlorites and chlorhydrins including chlorocarbinols respectively, of cellulose. Likewise, the hypochlorites and chlorhydrins including chlorocarbinols of already formed cellulose chlorides are formed as intermediates in the formation of higher chlorination products. These intermediate products can be obtained at any desired stage of the chlorination by the same procedure as discussed above, namely, by simple cooling of the reaction mixture and then removing unused chlorine and hydrogen chloride. In this connection, however, it should be noted that the products of intermediate degrees of chlorination are less stable than the forms designated as monochloride, dichloride, trichloride, tetrachloride and hexachloride (which are largely alpha-chlorocarbonyl compounds), and that these intermediate forms may lose chlorine in the form of HCl and Cl₂, to a certain extent at least, when the reaction is interrupted, or subsequently, and depending to a certain extent upon the subsequent handling thereof.

In order to guard against destructive decomposition of the cellulose, I prefer to conduct the reaction during the stage prior to the attainment of the monochloride condition, that is prior to the time when approximately 17% by weight of chlorine becomes chemically bound to the cellulose, so that the molecular ratio of chlorine to hydrogen chloride in the zone of reaction, that is in the liquid chlorine phase surrounding the cellulose, exceeds approximately 6 to 1. Any desired means may be employed for insuring this excess of chlorine over hydrogen chloride present, such as, use of an originally sufficient excess of chlorine, the addition of further chlorine, the removal of hydrogen chloride, or any combination thereof, or otherwise. Subsequent to the monochloride stage, the ratio of chlorine to HCl is not critical.

While I prefer to employ substantially undiluted liquid chlorine in my process (except for such HCl as dissolves therein in the practice of the process), it is to be understood that a solvent for the chlorine or a non-solvent diluent may be present, particularly if such solvent or diluent is inert in the sphere of the reaction. Thus chlorine in solution might be employed, such as for example, a solution of chlorine in carbon tetrachloride or any other suitable solvent which is inert under the conditions obtaining in the chlorination reaction. The concentration of chlorine in any such solution should be at least 50%, and preferably at least 75%, such as, at least 90%.

For effective chlorination of the cellulose charged to the process, the state of sub-division of the cellulose should preferably be such as to permit the chlorine to intimately contact the same for reaction purposes as will be understood. This applies particularly when it is desired to react the entire body of the cellulose charged as distinguished from merely the surface thereof. Materials such as cotton linters are readily penetrated by liquid chlorine so as to be thoroughly wetted therewith, and, therefore, require no greater degree of sub-division, although as will be understood, a higher degree of sub-division may be obtained, if desired, by any suitable means such as by grinding, mascerating, or otherwise.

After the cellulose and liquid chlorine are charged to the process, which, for convenience, is usually at temperatures at or below room temperatures, it is preferred that the charge be brought up to temperature for chlorination purposes slowly in order to control the rate of reaction and the rate of heat evolution.

The invention is further illustrated by the following examples:

*Example 1*

A 15 grams sample of dry cellulose in the form of ashless filter paper was introduced into a glass lined autoclave adapted for shaking, which was then closed and the interior temperature reduced to −23° C. 450 grams of liquid chlorine at room temperature was then introduced into the autoclave. Shaking of the autoclave was then started and the temperature of its contents was raised at the rate of 0.7° C. per minute until 70° C. was reached. The latter temperature was maintained for eight days during which time the shaking of the autoclave continued. The autoclave was then cooled down to room temperature, the gases bled out, and the autoclave opened, and the chlorinated product removed. This product was further degassed under vacuum, and was then stored at −23° C. It was found to contain chemically bound chlorine in the amount of 22.79% by weight.

The cellulose used in the following three examples was of a grade known in the trade as Chemical Cotton and was derived from purified cotton linters from cottonseed hull shavings pulp, and was of the type used for the manufacture of the highest quality cellulose acetate. It contained initially 4.35% moisture and was dried overnight in a vacuum oven at 110° C. prior to the chlorination reactions.

*Example 2*

A 14.35 grams sample (0.08855 mole of glucoside units) of the "Chemical Cotton," previously dried in vacuo at 110° C., was placed in the autoclave of Example 1; and the autoclave was chilled to −23° C. prior to introduction of the chlorine. Liquid chlorine, chilled to +6° C., was added; the weight of chlorine added was 600 grams. Temperature of the autoclave was −10° C. after addition of the chlorine. The autoclave was then shaken and was heated to 126° C. in a period of 60 minutes, an over-all average rate of heating of 2.27° C./minute. The temperature was allowed to drop to 100° C., and was maintained at 100° C. for a period of 24 hours, after which time the autoclave was cooled quickly to below room temperature. The gases were bled from the autoclave through scrubbers containing water (to absorb the HCl formed); the autoclave was opened, and the product was removed. The product was degassed in vacuo at room temperature.

The product was yellow in color, and retained the fibrous structure of the original cellulose; it formed a matted, porous cake. At the edges of the cake was a very small amount of dark brown gummy substance. This product contained 41.86 per cent chlorine by weight (chemically bound), and weighed 20.97 grams. The chlorination reaction had produced 0.7422 mole of HCl.

*Example 3*

A 14.62 gram sample (0.0902 mole of glucoside units) of the "Chemical Cotton," previously dried in vacuo at 110° C., was placed in the autoclave of Example 1; and the autoclave was chilled to −23° C. prior to introduction of the chlorine. Liquid chlorine, chilled to +6° C., was added; the weight of chlorine added was 480 grams. Temperature of the autoclave was −10° C. after addition of the chlorine. The autoclave was then shaken and was heated to 105° C. in a period of 60 minutes, an over-all average rate of temperature rise of 1.92° C./minute. The temperature was allowed to drop to 100° C., and was maintained at that temperature for a period of 24 hours, after which time the autoclave was cooled quickly to below room temperature. The gases were bled from the autoclave through scrubbers containing water (to absorb the HCl formed); the autoclave was opened, and the product was removed. The product was degassed in vacuo at room temperature.

This product was of a dark brown color; about two-thirds of the product comprised a dense lump of solid material, and the remaining one-third comprised a syrupy liquid. At −23° C., the whole product had become a hard solid which could be ground in a mortar. None of the fibrous structure of the cellulose was retained in the final product. The whole mixed product contained 44.56 per cent of chemically bound chlorine, and weighed 21.46 grams. The chlorination reaction had produced 0.7833 mole of HCl.

*Example 4*

A 14.85 gram sample (0.09159 mole of glucoside units) of "Chemical Cotton," previously dried in vacuo at 110° C., was placed in the autoclave of Example 1; and the autoclave was chilled to −23° C. prior to introduction of the chlorine. Liquid chlorine, chilled to +6° C., was added; the weight of chlorine added was 450 grams. The temperature of the autoclave was −10° C. after addition of the chlorine. The autoclave was then shaken and was heated to 90° C. in a period of 100 minutes, an over-all average rate of temperature rise of 1.00° C./minute. The temperature of 90° C. was maintained for 24 hours, after which time the autoclave was cooled quickly to below room temperature. The gases were bled through scrubbers containing water (to absorb the HCl formed); the autoclave was opened, and the product was removed. The product was degassed in vacuo at room temperature.

The product, lemon yellow in color and apparently homogeneous, retained the matted fibrous structure of the cellulose; it was easily ground in a mortar to form a fine powder. The product weighed 19.06 grams, and contained 29.53 per cent by weight of chemically bound chlorine. The chlorination reaction had produced 0.5006 mole of HCl.

*Example 5*

In conducting the reaction in a sealed glass tube, a 1.5 gram sample of anhydrous cellulose, in the form of ashless filter paper, was introduced into a heavy walled Pyrex tube, open at one end, which was then cooled to a temperature of −76° C. 45 grams of chlorine was then condensed inside the tube, the open end of which was then sealed with care by means of the flame of an oxygen torch. During the charging and sealing operations, care was taken to avoid condensation of moisture within the tube. The tube with contents was then removed from the cold bath, was encased in a protective metal cover and was warmed gradually to a temperature of 70° C., and was maintained at this temperature for eight days. At the conclusion of this period, the tube with contents was again cooled to −76° C., one end of the tube was opened by means of the oxygen torch, and the volatile components were then eliminated by application of gentle heat. The product, which was removed and further freed of adhering gases, was found to contain chemically bound chlorine.

The data of Examples 2, 3 and 4 indicate that oxidation (conversion of hydroxyl groups to carbonyl groups) has occurred in addition to substitutive chlorination.

From the foregoing it will be seen that my process provides a means whereby useful derivatives may be obtained by interaction of relatively abundant and inexpensive raw materials, and, therefore, is of outstanding potential industrial value.

It will be understand that the above particular description is by way of illustration, and that changes, omissions, additions, substitutions and/or modifications may be made by persons skilled in the art, without departing from the spirit of the invention, which is intended to be limted only by the scope of the claims.

I claim:

1. A process for the chlorination of cellulose, comprising immersing said cellulose in liquid chlorine, and maintaining said cellulose immersed in said liquid chlorine under elevated temperature and super-atmospheric pressure until the chemically combined chlorine content of said cellulose reaches at least 5%.

2. A process for the chlorination of cellulose, comprising maintaining cellulose immersed in liquid chlorine under elevated temperature and superatmospheric pressure until the chemically combined chlorine content of the cellulose reaches at least 5%, and maintaining in the zone of the reaction a molecular ratio of chlorine to hydrogen chloride formed of at least about 6:1 when the amount of combined chlorine in the cellulose is less than 17%.

3. A process for the chlorination of cellulose, comprising maintaining cellulose immersed in liquid chlorine under elevated temperature and superatmospheric pressure until the chemically combined chlorine content of the cellulose reaches at least 10%, and maintaining in the zone of the reaction a molecular ratio of chlorine to hydrogen chloride formed of at least about 6:1 when the amount of combined chlorine in the cellulose is less than 17%.

4. A process for the chlorination of cellulose, comprising maintaining cellulose immersed in liquid chlorine under elevated temperature and superatmospheric pressure until the chemically combined chlorine content of the cellulose reaches at least 17%, and maintaining in the zone of the reaction a molecular ratio of chlorine to hydrogen chloride formed of at least about 6:1 when the amount of combined chlorine in the cellulose is less than 17%.

5. A process for the chlorination of cellulose, comprising maintaining cellulose immersed in liquid chlorine under elevated temperature and superatmospheric pressure until the chemically combined chlorine content of the cellulose reaches a value between 5% and 60%, and maintaining in the zone of the reaction a molecular ratio of chlorine to hydrogen chloride formed of at least about 6:1 when the amount of combined chlorine in the cellulose is less than 17%.

6. A process for the chlorination of cellulose, comprising maintaining the cellulose immersed in liquid chlorine at a temperature between 50° and 150° C. until chemical combination between the cellulose and chlorine has occurred resulting in evolution of hydrogen chloride, and maintaining in the zone of the reaction a molecular ratio of chlorine to hydrogen chloride formed of at least about 6:1 when the amount of combined chlorine in the cellulose is less than 17%.

7. A process for the chlorination of cellulose, comprising maintaining the cellulose immersed in liquid chlorine at a temperature between 70° and 130° C. until chemical combination between the cellulose and chlorine has occurred, resulting in evolution of hydrogen chloride, and maintaining in the zone of the reaction a molecular ratio of chlorine to hydrogen chloride formed of at least about 6:1 when the amount of combined chlorine in the cellulose is less than 17%.

8. The process of claim 2, but in which the reaction is carried out under substantially anhydrous conditions.

9. The process of claim 2, but in which the reaction is carried out in the presence of water.

10. A chlorinated cellulose containing at least 5% chemically combined chlorine.

11. A chlorinated cellulose containing at least 10% chemically combined chlorine.

12. A chlorinated cellulose containing between about 5% and about 60% chemically combined chlorine.

13. A chlorinated cellulose product comprising cellulose mono-chloride.

14. A chlorinated cellulose product comprising cellulose dichloride.

15. A chlorinated cellulose product comprising cellulose trichloride.

16. The process of claim 2 in which the reaction is carried out in the presence of a solvent which is inert under the conditions obtaining.

17. The process of claim 16 in which the solvent is a non-polar solvent.

18. The process of claim 2 in which the reaction is carried out in the presence of up to 2% of water.

19. The process of claim 2 in which the reaction is carried out in the presence of from 20% to 1000% of water by weight based on dry cellulose.

HAROLD N. BARHAM.

REFERENCES CITED

The following references are of record in the file of this patent:

UNITED STATES PATENTS

| Number | Name | Date |
|---|---|---|
| 2,073,052 | Dreyfus | Mar. 9, 1937 |
| 2,448,510 | Barham | Sept. 7, 1948 |

FOREIGN PATENTS

| Number | Country | Date |
|---|---|---|
| 418,133 | Great Britain | Oct. 16, 1934 |

OTHER REFERENCES

Ott: "Cellulose and Cellulose Derivatives," 1943, pp. 577–581, 594.

Heuser: Cellulose Chemistry, 1924, pp. 109–110.

Marsh et al.: Chemistry of Cellulose, 1938, pp. 214–217.

Barham et al.: J. A. C. S., vol. 68, June 1946, pp. 1018–1023.